United States Patent

[11] 3,594,988

| [72] | Inventors | Karl-Heinz Eisenlohr<br>Buchschlag;<br>Helmut Klein, Hanau, both of, Germany |
|---|---|---|
| [21] | Appl. No. | 000,992 |
| [22] | Filed | Jan. 6, 1970 |
| [45] | Patented | July 27, 1971 |
| [73] | Assignee | Metallgesellschaft AG<br>Frankfurt on Main, Germany |
| [32] | Priority | Jan. 31, 1969 |
| [33] | | Germany |
| [31] | | P 19 04 744.0 |

[54] RECOVERY OF ACETYLENE FROM RAW ETHYLENE
5 Claims, 1 Drawing Fig.

[52] U.S. Cl. .................................................... 55/64
[51] Int. Cl. ........................................................ B01d 19/00

[50] Field of Search ............................................ 55/64, 65

[56] References Cited
UNITED STATES PATENTS

| 1,900,655 | 3/1933 | Metgger ........................ | 55/64 X |
| 3,023,842 | 3/1962 | Grover et al. .................. | 55/64 |
| 3,087,310 | 4/1963 | Rottmayr ...................... | 55/64 X |

*Primary Examiner*—Samih N. Zaharna
*Assistant Examiner*—R. W. Burks
*Attorney*—Burgess, Dinklage & Sprung

ABSTRACT: Acetylene is recovered from an ethylene-acetylene-ethane gas mixture by absorbing the acetylene therefrom, flashing and stripping the absorbate, compressing and scrubbing the gases from the stripping step with fresh solvent, and recovering the acetylene from the absorbate from the second scrubbing step.

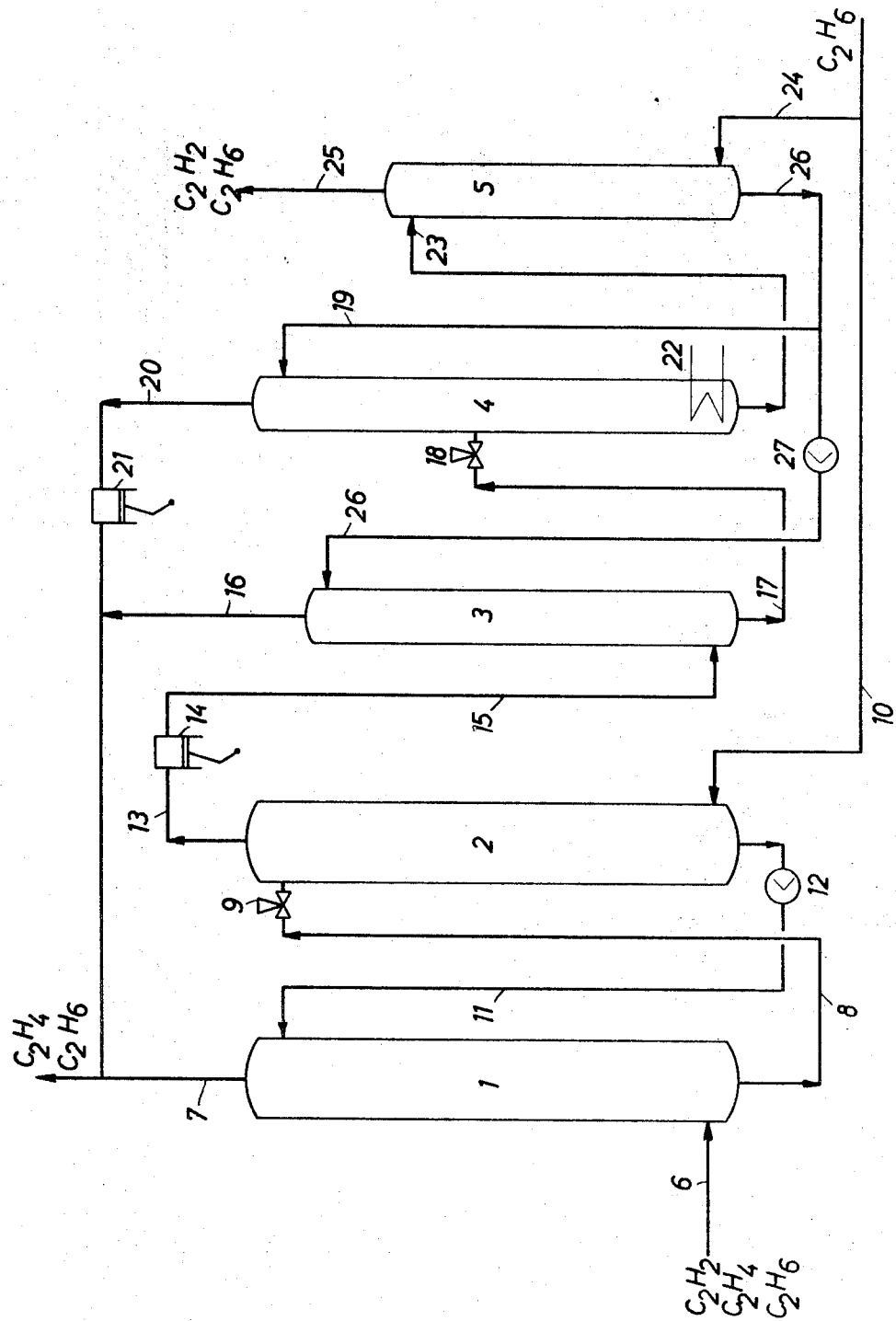

RECOVERY OF ACETYLENE FROM RAW ETHYLENE

In the production of ethylene by thermally cracking hydrocarbons, the processing of the cracked gases results in a raw ethylene, which contains about 10—20 volume percent ethane and 0.5—2 volume percent acetylene. This raw ethylene cannot be purified by distillation because ethylene forms azeotropic mixtures with acetylene as well as with ethane.

The acetylene contained in the raw ethylene can be selectively hydrogenated over a suitable catalyst or can be absorbed by scrubbing it with a suitable solvent. The mixture of ethylene and ethane which remains in both cases can be separated by distillation without difficulty. Both methods of purifying raw ethylene involve losses of ethylene, which losses in large ethylene plants can be considerable.

When the raw acetylene has been removed from the raw ethylene by scrubbing with a selective solvent the raw acetylene obtained still has an ethylene content of 30 to 50 percent. This raw acetylene cannot be utilized in practice.

THIS INVENTION

Acetylene can be separated from the raw ethylene with the aid of selective solvents and without losses of ethylene according to this invention if the raw acetylene is subjected to two enriching stages, whereby a mixture is recovered which consists of acetylene and ethane and which is free of ethylene and can be processed to produce pure acetylene or can be used for chemical syntheses.

This invention relates to a process of separating acetylene from crude ethylene, which has been produced by a thermal cracking of hydrocarbons, which process comprises absorbing the acetylene in selective solvents under pressure and then regenerating the solvents.

This process comprises completely removing the acetylene contained in a raw cracked ethylene by scrubbing with a selective solvent. The acetylene and coabsorbed parts of ethylene and ethane are then removed from the laden solvent by flashing the solvent to ambient pressure and stripping it with pure ethane. The exhaust gas produced by this regenerating treatment is compressed and scrubbed with a selective solvent for acetylene to remove all the acetylene from the exhaust gas and the solvent which is thus laden is flashed in a reabsorber having a heated sump. Pure solvent is supplied to this reabsorber at the top thereof, and acetylene is separated from the sump product of the reabsorber.

The sump product of the reabsorber can be simply heated to separate the acetylene. This results in the separation of an acetylene having a fairly high concentration. Alternative, the sump product of the reabsorber may be stripped with pure ethane to separate the acetylene. This step results in an acetylene-ethane mixture, which can serve as a starting material for syntheses using acetylene. The ethane behaves like an inert gas component. An example of such synthesis is the addition of hydrogen chloride to acetylene to form vinyl chloride. The gas remaining after such a synthesis consists of ethane, which can be recycled into the acetylene recovery plant according to this invention.

Different solvents can be used in the two absorption processes with separate solvent cycles. It is preferred however to use the same solvent in both cycles. Suitable solvents are, acetonitrile, dimethyl formamide, N-Methyl pyrrolidone, and the like.

The small amounts of acetylene contained in raw ethylene obtained by cracking and which in large plants for a production of ethylene are produced in economically significant quantities are according to this invention recovered simply and in such a quality that they can be utilized economically. This process has the advantage that there is no point where the pressure and temperature conditions are in or near the range in which acetylene is decomposed. The need for a relatively high temperature and/or a vacuum are avoided, particularly when high-boiling solvents are used.

THE DRAWING

The drawing is a simplified flow diagram of the process of this invention.

DISCUSSION

With reference to the drawing, the plant consists of a first absorption stage comprising an absorption tower 1 and a regeneration tower 2, and a second absorption stage comprising an absorption tower 3, a reabsorber 4, and a regeneration tower 5. The reabsorber is a column which has a heatable sump indicated at 22. Pure solvent is supplied to column 4 at the top thereof. The laden solvent from the absorption tower of the second stage is flashed and fed to column 4 on an intermediate level.

The raw ethylene to be purified is introduced through conduit 6 to the sump of absorption tower 1. This absorption tower is operated with a pressure which is as high as possible so that the amount of solvent required is minimized. The temperature is as low as possible but adequately above the condensation point of the raw gas components.

The pressure, temperature, amount of solvent and number of plates in the column 1 are selected so that all acetylene is removed by scrubbing in the first absorption stage. The pressure and temperature in that stage will preferably be selected in accordance with the corresponding values of the raw ethylene which is supplied.

An acetylene-free mixture of ethylene and ethane is withdrawn through a conduit 7 from the top of the absorption tower 1. The solvent which is laden with all acetylene and substantial amounts of ethylene from the raw gas is withdrawn from the sump of the absorption tower 1 through conduit 8 and conducted through an expansion valve 9 to the top of the regeneration tower 2. The absorption tower 2 is a stripping column in which the laden solvent is regenerated at atmospheric pressure by stripping with pure ethane, which is introduced through the conduit 10 into the sump. Not heat is supplied in this stripping step. The regenerated solvent is recycled through conduit 11 by means of a pump 12 to the top of the absorption tower 1.

The exhaust gas from the regeneration stage is a mixture of ethane, ethylene and acetylene, in which the acetylene ethylene ratio is higher approximately 10 fold than in the raw ethylene. The exhaust gas is conducted by conduit 13 to a compressor 14 in which the gas is compressed approximately to the pressure of the raw ethylene. The compressed gas is conducted by conduit 15 to the sump of the second absorption tower 3. The design of this absorption tower is based on the same considerations as that of absorption tower 1. The number of plates and the amount of solvent are so selected in view of the temperature and pressure of the incoming gas that all acetylene is removed by scrubbing. An ethylene-ethane mixture is withdrawn by conduit 16 from the top of absorption tower 3 and is combined with the overhead gas in conduit 7 from absorption tower 1.

Laden solvent is conducted from the sump of the absorption tower 3 by conduit 17 to an expansion valve 18 and from the latter is supplied under ambient pressure onto a plate or reabsorber 4 at an intermediate level thereof.

The solvent is degassed as it flows down into the lower portion of the tower to the heated sump. The gases which are thus separated and the gases which are released by flashing are scrubbed in the upper portion of the tower with pure solvent, which is supplied by conduit 19 to the top of reabsorber 4.

The exhaust gas from reabsorber 4 is a high-ethylene fraction, which is conducted in by conduit 20 to a compressor 21 and in the latter is brought to the pressure of the overhead gases from the absorption towers 1 and 3 and is combined with the gases from conduit 16 and passed to conduit 7.

The sump of the reabsorber is maintained by a heater 22 and at an elevated temperature and solvent laden only with acetylene is withdrawn from the sump by conduit 23 and is supplied to the top of regenerating tower 5. In the latter, the acetylene is removed with the aid of pure ethane, which is supplied to the sump by conduit 24. The overhead product is withdrawn from regeneration tower 5 through conduit 25 and consists of an acetylene which is diluted with ethane and is highly suitable for syntheses, e.g., for the production of vinyl chloride.

Alternatively, the ethylene can be separated from the laden solvent by heating alone. In this case a heater, not shown, is incorporated in known manner into the sump of regeneration tower 5. A heat exchange and, if desired, an additional cooling is then effected between the colder solvent streams in conduits 23 and 17, on the one hand, and, on the other hand, the hot regenerated solvent, which is recycled through conduits 26 and 19 to absorption tower 3 and reabsorber 4.

EXAMPLE

A raw ethylene consisting of (weight percent):

$C_2H_4$    83.8

$C_2H_6$    15.2

$C_2H_2$    1.0 is purified by a selective absorption with acetonitrile.

In an absorption tower 1 having 20 plates, 47,240 kg. raw ethylene per hour are scrubbed with 133 cubic meters of acetonitrile per hour under a pressure of 15 kg. per square centimeter absolute pressure and at a mean temperature of 0° C. The overhead gas in conduit 7 contains:

84.2 wt. percent = 35,635 kg. $C_2H_4$ per hour 15.8 wt. percent = 6,678 kg. $C_2H_6$ per hour less than 10 p.p.m. $C_2H_2$ per hour.

Having absorbed 470 kg. acetylene, 3,950 kg. ethylene and 512 kg. ethane per hour, the absorbent is regenerated in a 25-plate regeneration tower 2 under a pressure of 1.2 kg. per square centimeter absolute pressure and at a mean temperature of 0° C. by stripping with 8,100 kg. ethane per hour. It is then recycled to the absorption tower 1. The overhead gas from the regenerating tower 2 consists of:

31.5 wt. percent = 3,950 kg. $C_2H_4$ per hour 64.75 wt. percent = 8,100 kg. $C_2H_6$ per hour 3.75 wt. percent = 470 kg. $C_2H_2$ per hour This overhead gas is compressed to 15 kg. per square centimeter absolute pressure, cooled, and in a 21-plate absorption tower 3 is scrubbed at 0° C. with 31 cubic meters acetonitrile per hour. The gas fraction escaping from the top of the absorber 3 has the following composition:

32.3 wt. percent = 3,740 kg. $C_2H_4$ per hour 67.7 wt. percent = 7,850 kg. $C_2H_6$ per hour below 10 p.p.m. $C_2H_2$.

This gas is withdrawn in conduit 16 and is combined with the gas withdrawn in conduit 7 from the top of the absorption tower 1.

The solvent from absorption tower 3 is processed in reabsorber 4. The latter has ten plates in its lower portion and 20 in its upper portion. It is operated under a pressure of 1.2 kg. per square centimeter atmospheric pressure, a sump temperature of 40° C., and a top temperature of 0° C. 13 cubic meters acetonitrile per hour, at 0° C., are introduced into the top.

The overhead gas from the reabsorber consists of:

21.2 wt. percent = 205 kg. $C_2H_4$ per hour 78.8 wt. percent = 762 kg. $C_2H_6$ per hour below 10 p.p.m. $C_2H_2$.

Thirteen cubic meters solvent containing 470 kg. acetylene are withdrawn per hour from the sump of the reabsorber.

This acetylene content is removed in the regene—ration tower 5 under a pressure of 1.2 kg. per square centimeter absolute pressure and at a mean temperature of 30° C. with 1,110 kg. ethane per hour. It can also be recovered as concentrated acetylene by heating the sump to 75° C. In both cases, the contamination of the acetylene with ethylene is less then 50 p.p.m.

We claim:

1. In a process of separating acetylene from a crude ethylene fraction containing minor amounts of ethane and acetylene by absorbing the acetylene in selective solvents under pressure and regenerating the solvents, the improvement comprising:
   completely removing the acetylene from said crude ethylene by scrubbing said crude ethylene with a solvent selective for said acetylene under pressure;
   removing acetylene and coabsorbed ethylene and ethane from the laden solvent thus obtained by flashing said laden solvent to ambient pressure and stripping with pure ethane;
   compressing the ethane gas produced by said stripping and scrubbing the so compressed gas with a solvent selective for acetylene to remove substantially all said acetylene from said exhaust gas;
   flashing the solvent from said scrubbing of said exhaust gas into a reabsorber having a heated sump;
   supplying pure solvent to said reabsorber at the top thereof; and
   separating acetylene product from the sump product of said reabsorber.

2. The process according to claim 1 wherein said sump product is stripped with substantially pure ethane to remove the acetylene.

3. The process according to claim 1 wherein said sump product is heated to remove the acetylene.

4. The process of claim 1 wherein the same solvent is used to absorb the acetylene from said crude ethylene and from said exhaust gas.

5. The process of claim 1 wherein the absorption of the acetylene from said crude ethylene and from said exhaust gas is carried out at substantially the same pressure.